US012560732B2

(12) United States Patent
Wang et al.

(10) Patent No.: US 12,560,732 B2
(45) Date of Patent: Feb. 24, 2026

(54) DYNAMIC RESOLUTION FULL-WAVEFORM INVERSION METHOD AND SYSTEM

(71) Applicant: CGG SERVICES SAS, Massy (FR)

(72) Inventors: Min Wang, Singapore (SG); Yi Xie, Singapore (SG)

(73) Assignee: CGG SERVICES SAS, Massy (FR)

( * ) Notice: Subject to any disclaimer, the term of this patent is extended or adjusted under 35 U.S.C. 154(b) by 392 days.

(21) Appl. No.: 18/302,119

(22) Filed: Apr. 18, 2023

(65) Prior Publication Data

US 2024/0210582 A1    Jun. 27, 2024

Related U.S. Application Data

(60) Provisional application No. 63/434,524, filed on Dec. 22, 2022.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/512* (2013.01); *G01V 2210/6222* (2013.01); *G01V 2210/675* (2013.01)

(58) Field of Classification Search
CPC .. G01V 1/282; G01V 1/303; G01V 2210/512; G01V 2210/6222; G01V 2210/675
See application file for complete search history.

(56) References Cited

U.S. PATENT DOCUMENTS

| | | | |
|---|---|---|---|
| 7,725,266 B2 * | 5/2010 | Sirgue | G01V 1/28 |
| | | | 702/6 |
| 10,353,092 B2 * | 7/2019 | Crawley | G01V 1/282 |
| 10,670,751 B2 * | 6/2020 | Qin | G01V 1/282 |
| 12,320,937 B2 * | 6/2025 | Ratcliffe | G01V 1/282 |

OTHER PUBLICATIONS

Adriano Gomes et al., "Extending the reach of FWI with reflection data: Potential and challenges," 2017, SEG International Exposition and 87th Annual Meeting, pp. 1454-1459.

(Continued)

*Primary Examiner* — Elias Desta

(74) *Attorney, Agent, or Firm* — PATENT PORTFOLIO BUILDERS PLLC

(57) ABSTRACT

A method for raw seismic data inversion includes receiving raw seismic data acquired over an underground formation, receiving an initial velocity model of the underground formation, performing a dynamic resolution full waveform inversion, DR-FWI, on the raw seismic data so that a tomography component of a velocity gradient G is compensated to generate a compensated tomographic component while a diving wave component and a migration component are preserved, outputting an updated velocity model based on an illumination compensated velocity gradient G', which is calculated based on the compensated tomographic component), and locating natural resources in the underground formation using the updated velocity model updated by the DR-FWI.

20 Claims, 12 Drawing Sheets

(56) References Cited

OTHER PUBLICATIONS

Adriano Gomes et al., "Improving reflection FWI reflectivity using LSRTM in the curvelet domain," 2018, SEG International Exposition and 88th annual Meeting, pp. 1248-1252.

Albert Tarantola, "Inversion of seismic reflection data in the acoustic approximation," Aug. 1984, Geophysics, vol. 49, No. 8, pp. 1259-1266.

J. Cooper et al., "Mitigating Cycle Skipping in Full-Waveform Inversion Using Partial Matching Filters," 2021, 82nd EAGE Annual Conference & Exhibition, Amsterdam, The Netherlands, 5 pages.

J. Virieux et al., "An overview of full-waveform inversion in exploration geophysics," Nov.-Dec. 2009, Geophysics, vol. 74, No. 6, pp. WCC1-WCC26.

Kenneth Irabor et al., "Reflection FWI," 2016, SEG International Exposition and 87th Annual Meeting, pp. 1136-1140.

M. Wang et al., "Dynamic-warping full-waveform inversion to overcome cycle skipping," 2016, SEG International Exposition and 86th Annual Meeting, pp. 1273-1277.

M. Warner et al., "Adaptive Waveform Inversion—FWI Without Cycle Skipping—Theory," 2014, 76th EAGE Conference & Exhibition 2014, 5 pages.

P Deng et al., "Correcting Fault Shadows—A Case Study Comparison of Fault-Constrained Tomography and Time-Lag Ullwaveform Inversion," 2022, 83rd EAGE Annual Conference & Exhibition, Madrid, Spain, 5 pages.

P. Mora, "Inversion = migration + tomograpy," Dec. 1989, GeoPhysics, vol. 54, No. 12, pp. 1575-1586.

Ping Wang et al., "A demigration-based reflection full-waveform inversion workflow," 2018, SEG International Exposition and 88th annual Meeting, pp. 1138-1142.

R. Poncet et al., "FWI with Optimal Transport: a 3D Implementation and an Application on a Field Dataset," Jun. 11-14, 2018, 80th EAGE Conference & Exhibition 2018, Copenhagen, Denmark, 5 pages.

Sheng Xu et al., "Inversion on Reflected Seismic Wave," 2012, 82nd SEG Annual International Meeting, 4 pages.

Tariq Alkhalifah, "Scattering-angle based filtering of the waveform inversion gradients," 2015, Geophysical Journal International, vol. 200, pp. 363-373.

Yaxun Tang et al., "Tomographically enhanced full wavefield inversion," 2013 Houston, 83rd SEG International Exposition and Annual Meeting, pp. 1037-1041.

Zhigang Zhang et al., "Correcting for salt misinterpretation with full-waveform inversion," 2018, SEG International Exposition and 88th annual Meeting, pp. 1143-1147.

Zhigang Zhang et al., "FWI Imaging: Full-wavefield imaging through full-waveform inversion," 2020, SEG International Exposition and 90th Annual Meeting, pp. 656-660.

* cited by examiner

DYNAMIC RESOLUTION FULL-WAVEFORM INVERSION METHOD AND SYSTEM

TECHNICAL FIELD

Embodiments of the subject matter disclosed herein generally relate to seismic data processing using a full-waveform inversion (FWI) technique, and more specifically, to using a dynamic resolution FWI for separating and enhancing a tomographic term to optimize a contribution of the low- and high-wavenumbers to the velocity model.

DISCUSSION OF THE BACKGROUND

In seismic surveys, sources (e.g., an airgun towed through water in a marine environment or a vibroseis truck for a land survey) emit waves that penetrate subsurface formations, being therein transmitted, reflected, refracted or diffracted at interfaces between layers with different elastic properties. Seismic sensors placed on top of the subsurface formations, in a borehole inside the subsurface formations, or in water, detect the returning waves, which carry information about the geophysical properties of the surveyed subsurface formations. The seismic sensors record data as time series of sampled wave amplitudes, which are called seismic traces. The recorded seismic data is processed to extract the information, for example, to generate structural models of the subsurface formations, thus exploring for the presence and location of sought-after natural resources (hydrocarbons, geothermal water, minerals of interest, etc.). In addition, the seismic data may be used for determining subfloor locations for carbon capture and sequestration (which may be linked to the oil and gas development operations), estimate potential geothermal reserves, and/or identify/estimate the presence/absence of other subsurface resources, such as minerals.

Full-waveform inversion, FWI, is a technique (described, for example, in the 1984 article "Inversion of seismic reflection data in the acoustic approximation" by Tarantola A., published in *Geophysics*, Vol. 49(8), pp. 1259-1266, and the 2009 article "An overview of full-waveform inversion in exploration geophysics" by Virieux J. and Operto S., published in *Geophysics*, Vol. 74(6), pp. WCC1-26) for deriving high-resolution models of subsurface formations from the recorded seismic data. The models are three-dimensional maps of model parameters, for example, P- and S-wave velocity, density, attenuation, anisotropy, etc.

FWI is a nonlinear inversion that determines values of one or more model parameters to minimize the misfit between the seismic data acquired during a seismic survey and modeled data generated using a candidate (initial) model of the surveyed subsurface formation (the initial model being improved by the minimization by the FWI process). In this regard, the FWI may, for example, minimize an objective/cost function that measures the least-squares difference between the acquired data and the modeled data. Other objective functions may be selected as discussed later. The minimization may be pursued as an iterative approach (e.g., using gradient-descent algorithms) repeatedly updating the formation's model and then regenerating model data using the updated model. Once it converges, the resulting model is considered a true structural image of the explored subsurface formation because modeled data generated using this model is consistent with the observed data.

In FWI, generating simulated data involves tracking the seismic wave's path through the initial model of the underground formation using an appropriate wave equation. The wave equation represents the physics of the wave propagation including one or more of anisotropy, attenuation, elasticity, etc. according to the parameter values of the current formation's model. A realistic representation of the wave propagation in the real Earth is provided by the visco-elastic wave equation but using this equation is expensive from computational time and computational memory point of view. Various techniques have been developed to reduce the computational cost, for example, by performing a correction to the acoustic propagation, by designing matching filters to de-elastify the observed data, by deriving a quasi-elastic wave equation for single scattering only, by automatically attenuating the shear-waves during the propagation, etc.

All these techniques use as input data the full wavefield of the seismic traces, which include diving waves and reflections waves, and therefore, they naturally optimize the velocity model for both the diving waves and reflection energies. As explained in [1], there are four scattering terms $S^{+-}$, $S^{-+}$, $S^{++}$, and $S^{--}$ for the perturbation of the field variable, and these terms' paths are simplistically illustrated in FIG. 1. Note that a source S is placed on or below a surface 110 (can be the Earth's surface for land acquisition or the water surface for marine acquisition), there is at least one reflector 112, i.e., the interface between two layers 118 and 119 in the subsurface (where the wave are reflected due to the difference in the impedance values of the two layers), and there is a natural resource 114, for example, an oil reservoir, gas reservoir, a mineral, a porous volume that can hold $CO_2$, a geothermal reservoir, or any other substance that is considered of interest to human beings. The layers 118 and 119 (more layers may be present) are commonly referred to as a subsurface formation 121. Plural sensors 116 are placed at the surface for recording the reflected or scattered waves.

The first superscript of the four scattering terms $S^{+-}$, $S^{-+}$, $S^{++}$, and $S^{--}$ refers to the incident ray direction while the second superscript refers to the scattered ray direction ("+" is downward and "−" is upward). The scattering term $S^{-+}$ is a multiple and is thus classified as a second-order term, while the other terms represent primaries. The first two terms $S^{+-}$ and $S^{-+}$ are the reflection-scattering terms and these terms lead to the resolution of high vertical wavenumbers. A wavenumber is defined herein as a ratio between the angular frequency of an investigated wave and its velocity in the subsurface, as defined in [1]. The top of the reservoir 114 is responsible for the $S^{+-}$ term while the deeper reflector 112 has introduced the other three terms. The $S^{-+}$ term corresponds to the waves that travel down from the source, reflect up from the reflector 112, are downward scattered from the reservoir 114 back to the reflector 112, and then are reflected back to the sensors 116. The last two terms $S^{++}$ and $S^{--}$ are the transmission scattering terms and they lead to the resolution of the low vertical wavenumbers.

The $S^{++}$ and $S^{-+}$ terms are migration-like terms while the $S^{++}$ and S terms are reflection tomography-like terms. The $S^{+-}$ term is responsible for the migration term, $S^{-+}$ corresponds to back scattering of waves incident on the reservoir 114, and $S^{++}$ and $S^{--}$ correspond to transmission scattering and thus they generate the tomographic terms. The problem with these terms is that the low-wavenumber velocity updates driven by reflections is often very weak (in terms of the corresponding energy) compared to the high-wavenumber component that dominates the FWI gradient of reflection and has limited impact on kinematics. Conventional tools, for example, ray-based tomography is still the main approach for velocity model building beyond the reach of the diving waves. In other words, the contribution of the low- and high-wavenumber terms is not balanced in the existing algorithms.

To address these issues, there is a need to adapt the FWI framework to enhance the weak term. In the past, several attempts and developments have been made in the seismic field [2-6] to address the unbalanced energy issue. The main goal of these attempts is how to generate reflections to separate/enhance the low-wavenumber component and how to robustly update the velocity in an iterative scheme. These contributions can be separated into two major groups: one type of method is to extract or enhance the low-wavenumber components from full wavefield gradient. An intermediate model, either velocity [4] or density [5], is used to generate the contrast for reflections. Following that, different gradient components can be extracted by selectively correlating the wavefield traveling in different directions [3, 5] or separate them via a scattering angle filter [7] for target velocity update. Another approach is to use Born modelling from images as a second source to generate reflected wavefield which is a native way to produce reflection and isolate the low-wavenumber velocity [2, 6]. This type of method typically works with primary only data, which means that seismic data pre-processing is required to remove the multiples.

To better extract the benefits of the reflection energy from raw seismic data, a way was explored in which a weighting factor was used to promote the tomographic term from reflection energies and further improve updates related to a deep section beyond the diving waves penetration [3, 8]. However, none of these approaches fully solve the problem of enhancing the energy associated with the low-wavenumbers for the velocity model.

Thus, there is a need to find a new method that overcomes the above noted problems, balances the contribution of the low-wavenumber and high-wavenumber to the velocity model, and acts on the raw seismic data.

SUMMARY

Methods and devices according to various embodiments perform an FWI on raw seismic data for enhancing a tomographic component.

According to an embodiment, there is a method for raw seismic data inversion. The method includes receiving raw seismic data acquired over an underground formation, receiving an initial velocity model of the underground formation, performing a dynamic resolution full waveform inversion, DR-FWI, on the raw seismic data so that a tomography component of a velocity gradient G is compensated to generate a compensated tomographic component while a diving wave component and a migration component are preserved, outputting an updated velocity model based on an illumination compensated velocity gradient G', which is calculated based on the compensated tomographic component, and locating natural resources in the underground formation using the updated velocity model updated by the DR-FWI.

According to another embodiment, there is a computing device for raw seismic data inversion, and the device includes an interface for receiving raw seismic data acquired over an underground formation, and for receiving an initial velocity model of the underground formation and a processor connected to the interface and configured to: perform a dynamic resolution full waveform inversion, DR-FWI, on the raw seismic data so that a tomography component of a velocity gradient G is compensated to generate a compensated tomographic component while a diving wave component and a migration component are preserved, output an updated velocity model based on an illumination compensated velocity gradient G', which is calculated based on the compensated tomographic component, and locate natural resources in the underground formation using the updated velocity model updated by the DR-FWI.

According to yet another embodiment, there is a computer readable recording medium storing executable codes that when executed by a computer makes the computer perform a method for raw seismic data inversion as discussed herein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
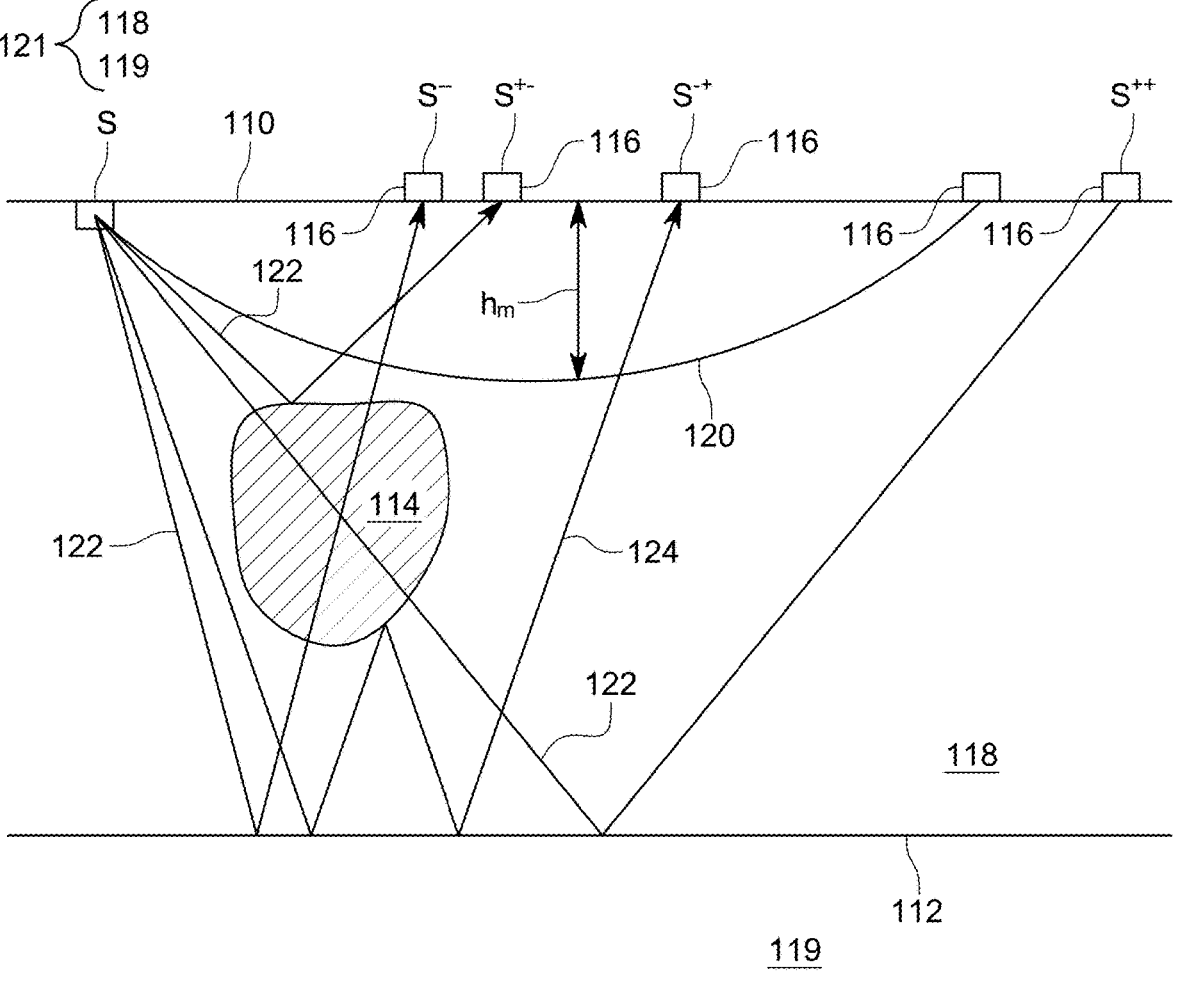
FIG. 1 is a schematic illustration of diving and reflected waves (reflected waves include four different types of scattering term) that appear when a source emits seismic energy into a subsurface.

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

In embodiments described in this section, the problems related to the low-wavenumber velocity updates driven by reflections being often very weak when compared to the high-wavenumber component, which dominates the FWI gradient of reflection, are mitigated by jointly using diving waves and reflections waves in raw seismic data with minimum pre-processing for velocity update with balanced low- and high-wavenumber components from shallow to deep sections. A method that performs such joint calculations is called herein the Dynamic Resolution FWI (DR-FWI) and it builds contrast in the velocity model enabling the simulation of reflections. Dynamic weighting is applied on different components on the full wavefield in the FWI kernel to optimize the contribution of the low- and high-wavenumber velocity. In this regard, note that the energy corresponding to the high-wavenumber velocity is at least one order of magnitude larger than the energy corresponding to the low-wavenumber velocity. The following embodiments try to correct this unbalance by making the energy contributions from the low- and high-wavenumbers to have a similar level.

The base FWI method can be either a least squares (for example, Virieux and Operto, 2009, An overview of full-waveform inversion in exploration geophysics: Geophysics, 74, no. 6, WCC1-WCC26), an optimal transport (R. Poncet, J. Messud, M. Bader, G. Lambaré, G. Viguier, C. Hidalgo [2018]. FWI with Optimal Transport: a 3D Implementation and an application on a Field Dataset. 80$^{th}$ EAGE Conference & exhibition 2018, Expanded Abstracts), an adaptive waveform (M. Warner and L. Guasch, 2014, Adaptive Waveform Inversion—FWI Without Cycle Skipping— Theory. 76th EAGE Conference & Exhibition 2014, Expanded Abstracts), a dynamic warping (M. Wang, Y. Xie, W. Q. Xu, K. F. Xin, B. L. Chuah, F. C. Loh, T. Manning, S. Wolfarth, 2016, Dynamic-warping full-waveform inversion to overcome cycle skipping. SEG International Exposition and 86th Annual Meeting. SEG, Expanded Abstracts, 1273-1277), a partial matching (Cooper, J., Ratcliffe, A. and Poole, G., 2021, Mitigating cycle skipping in full-waveform inversion using partial matching filters. 82nd EAGE Conference & Exhibition, Extended Abstracts), or a time-lag full waveform inversion (Zhang, Z., J. Mei, F. Lin, R. Huang, and P. Wang, 2018, Correcting for salt misinterpretation with full-waveform inversion: 88$^{th}$ Annual International Meeting, SEG, Expanded Abstracts, 1143-1147). Note that each of these methods, which are currently used in the field, suffers from the problems noted above. The novel DR-FWI method builds on any of these methods and balances the contribution of low- and high-wavenumber velocity as next discussed.

Before entering into the details of the DR-FWI method, the diving waves and the reflection/refracted waves are schematically illustrated in FIG. 1. The diving waves 120 are waves that return to the surface 110 at a given offset after a maximum penetration h$_m$, which is a function of the travel time t of the wave in the water and shallow subsurface, and the speed v of the wave in the water and shallow subsurface. This also means that the diving waves 120 cannot produce any information about the reservoir 114 in FIG. 1, as they do not go deep enough. Thus, the reflection waves 122, 124 are used for this region of the subsurface. Note that these waves reflect from various interfaces 112, anomalies within region/ reservoir 114 in the subsurface 121, etc. Because the waves 122 undergo a single reflection, they are called primaries, while the waves 124 are called multiples as they undergo plural reflections.

Modeling the reflections 122, 124 in synthetics is the first step when discussing how to make use of the reflected energy for velocity update. In full wave propagation, reflections would be generated by sharp boundaries 112, either from a velocity or a density contrast between the layers 118 and 119 that form the boundary 112. This condition seems difficult to be satisfied at the beginning of FWI applications because the starting velocity mostly is a smooth one. Note that in many instances, the FWI calculations start with a blank velocity model that might not even account for the various layers 118, 119. The authors in [2] assumed that the velocity model can be split into a background model and a perturbed one. The background velocity governs the kinematics and the perturbed one mainly affects the dynamic of the wavefield. The reflection energy can be generated by Born modeling using the background model and the corresponding images. Based on this assumption, low-wavenumber velocity would be updated by introducing Born modeling into the standard FWI kernel with varied objective function (see, for example, [2], [6]). Usually, primary only data is required for this kind of method since only reflection energy is used and all other energies are removed during the pre-processing of the raw seismic data. This methodology goes contrary to the requirement for the DR-FWI method of using raw seismic data. In this regard, note that raw seismic data means acquired seismic data that undergoes minimum processing, for example, denoising the swell noise, like the noise made by the vessel involved in the seismic data acquisition. No deconvolution, migration, dip filtering, normal-moveout correction, multiple attenuation processing is applied to the data to be considered raw seismic data.

The authors in [9] have discussed the importance of reflection generation for a better usage of low wavenumber in the velocity update although an amplitude eliminated cost function has been used. The study results showed that the Least Square Reverse Time Migration (LSRTM) image gives superior tomography update compared to the Reverse Time Migration (RTM) due to the accuracy of reflectivity. Another way is the so called 2-stage FWI, which first produces contrast into a temporary model, either velocity [4] or density [5], for reflections' generation, and then updates the low-wavenumber velocity in a second stage. The model, which contains the desired contrast, is reproduced in next iteration of the method. However, a double computational cost can be expected in this type of method.

Figure 2:
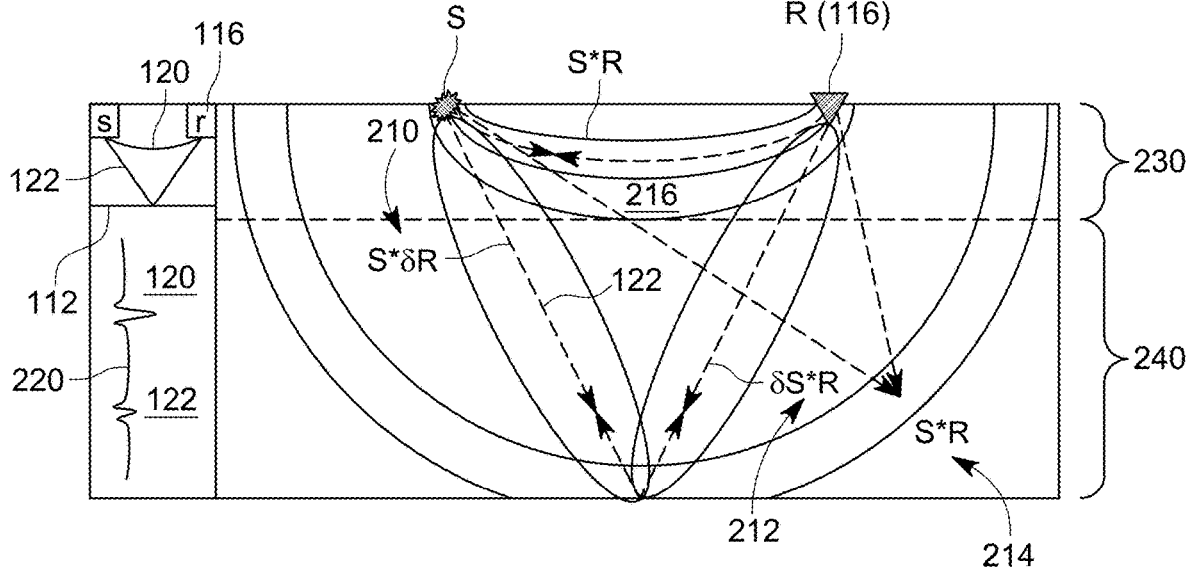
FIG. 2 is a schematic illustration of one trace's velocity gradient, which includes the tomography and migration components of the reflected waves and banana term from diving waves.

Recent applications [10], [11] demonstrated that FWI images have better illumination than RTM or even LSRTM due to the integration of full wave fields. Besides of the better illumination, the benefits of FWI image includes the use of raw seismic data while (LS-)RTM required processed data as input. The simplicity of input data greatly cut off the turnaround of processing period. From this point of view, the iteratively updated FWI velocity with the migration term, which achieves the desired contrast, would be the preferred way to naturally generate reflections more accurately. As the reflections can be modelled, they can be used later for kinematic measurement for velocity updates. As discussed in the Background Section with regard to [1], the reflection data produce two different components of the FWI gradient: the high-wavenumber component (terms S$^{+-}$, S$^{-+}$), also known as the migration term, and the low-wavenumber component (terms S$^{++}$, S$^{--}$), also known as the tomographic term or "rabbit ears". FIG. 2 schematically illustrates two tomography components 210 and 212, and a migration component 214 from reflection waves 122, as well as the so called "banana" component 216 corresponding to the diving wave 120. All these components or terms are recorded by the sensors 116 shown in FIG. 1, and are part of a seismic trace 220, which is schematically illustrated in FIG. 2. The tomographic components 210 and 212 are generated along the reflection wave path 122 and therefore, they contain information about the kinematics of the velocity model, including areas beyond the reach of diving waves 120. These two components correspond to the low wavenumbers. The migration component 214 is also generated due to a reflection wave, but this term corresponds to the high wavenumbers since the components are formed between up- and down-going wave. The migration component 214 and the tomographic term 210 and 212 are mixed in the gradient expression and thus, these components need to be separated from each other during the FWI process. The terms of the gradient can be distinguished by the direction of propagation of the source and residual wavefields as in [1, 3] or filtered according to the scattering-angle methodology developed by [7].

The velocity gradient G in the traditional FWI is known to be formed by two terms related to wavefields propagated from the source S and from the receiver R (116). The contribution to the velocity gradient G from both the diving wave 120 and the reflections 122 are summarized in equation (1), where the S(m)*R(m) is the term (migration and diving components) from the source and receiver side according to different object functions, and m is the inverted parameter, which is the velocity in this embodiment. Contribution δS(m)*R(m) or S(m)*δR(m) (where the term "δS" or "δR" means a scattered wavefield, and the operation "*" means the process of cross-corelation) happen on either the receiver or source side, respectively, for the tomographic component, from reflections that correspond to the last two terms at the right side of equation (1):

$$G_m = \int_{t=0}^{tmax} (S(m) * R(m) + \delta S(m) * R(m) + S(m) * \delta R(m))dt \qquad (1)$$

Thus, the FWI gradient G for a trace 220 has three components, the first component representing the contribution from the diving wave 120 and the migration component, and the second and third components representing the reflections on the source side and receiver side, also known as the tomographic component. The corresponding energies for these components may vary with more than one magnitude order due to the additional reflection and that is the reason why the tomographic component δS(m)*R(m)+S(m)*δR(m) is weaker than the migration and diving component S(m)*R(m) in the FWI velocity update.

To fix this imbalance between these components of equation (1), the authors in [8] have used a weighting factor to promote the tomographic component and therefore, try to solve the fault shadow problem. How to get a reliable weighting factor would be the key to success for that kind of method. The weighting would be based on trial-and-error for simplicity and that approach might be suitable to address some of the issues. However, it may not work in general, for all the issues.

Finding the root cause for the energy unbalanced of these components is the best way to solve the problem. The inventors believe that the reason of the weaker tomographic component's energy is the additional reflection process happening during wave propagation when compared to the migration component. The additional reflection can be compensated by the corresponding illumination volume, which can be designed in each iteration accordingly, by the so-called dynamic weighting, which can be applied on corresponding components after separation, as now discussed.

Figure 3:
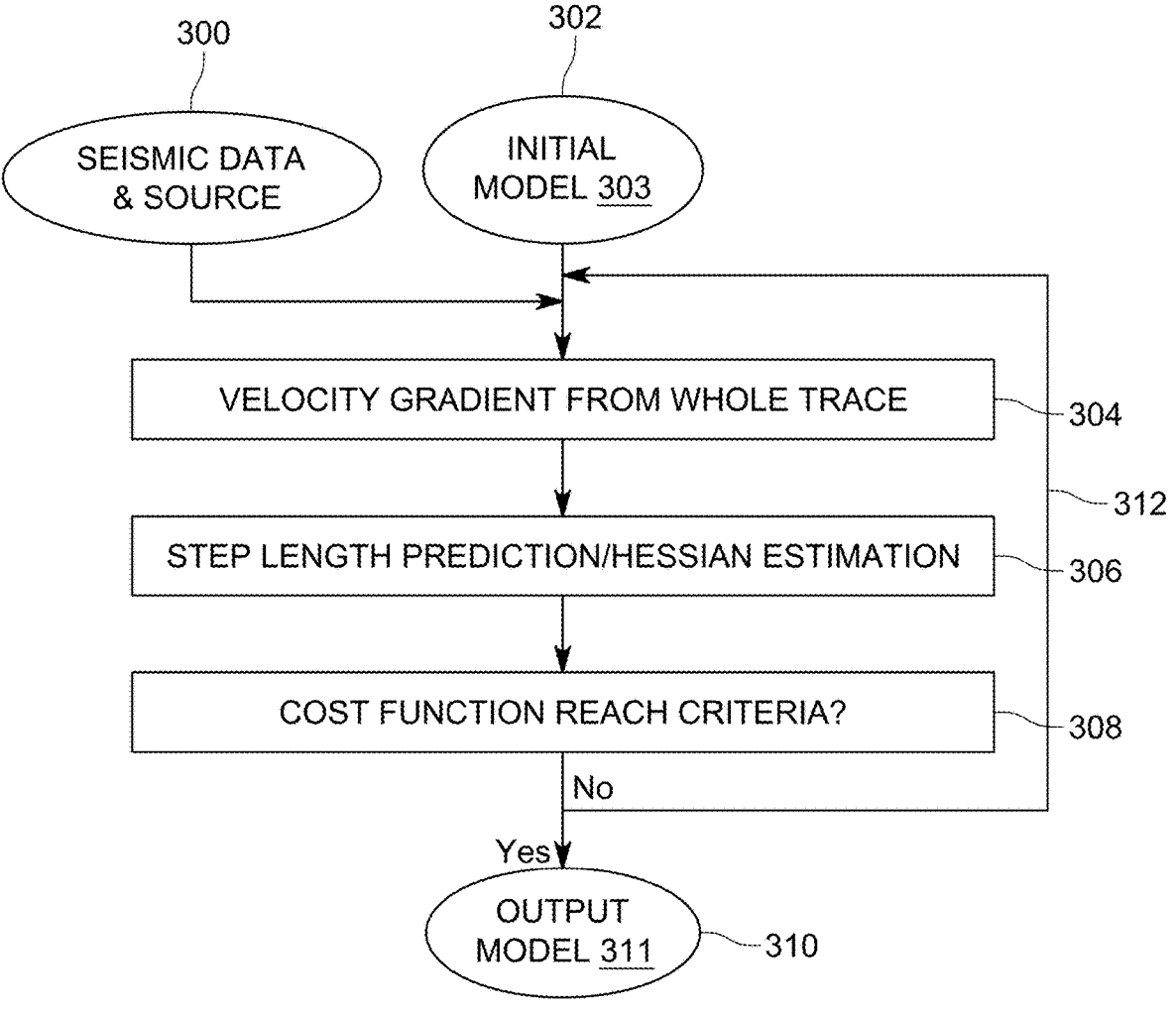
FIG. 3 is a flow chart of a traditional full waveform inversion method applied to the diving and reflected waves.

Typically, the wavefield separation will be applied on the whole area including the area dominated by the diving wave. FIG. 3 schematically shows the main steps of the traditional velocity inversion in FWI. The method includes a step 300 of receiving the acquired seismic data and source data. The method further includes a step 302 of receiving an initial velocity model 303, which is input, for example, by the operator of the system. Any initial velocity model may be used as an input as this model will be iteratively improved. In step 304, the velocity gradient G from the entire trace 220 (i.e., both the diving waves and the reflections waves) is calculated and in step 306 a step length prediction/Hessian estimate is calculated for being applied when the cost function is computed. In step 308, the calculated cost function is checked against a given threshold or criteria, and if the threshold or criteria is reached, the process outputs the calculated velocity model 311 in step 310. Otherwise, the system performs another iteration 312 to further improve the velocity model 311. In this approach, there is no balancing or correction between the low- and high-wavenumber components.

In the novel method discovered by the inventors, the completeness of the shallow section is maintained, without any decomposition. The shallow area 230 (see FIG. 2) can be defined by a pre-calculated mask through diving wave penetration analysis. The shallow area 230 can be considered to be a diving wave dominated area. The area 240 beyond the reach of the diving wave 120, which contributes to the tomographic and migration components can be separated by an early discussed method. The area 240 can be considered to be the reflection dominated area/zone. Therefore, there are three components in the velocity update loop with dynamic weighting that need to be separated from each other. With that, the contribution to low- and high-wavenumbers are optimized and balanced. After balancing the associated energy, the recombined gradient can be used to predict the step length. In this way, the tomography component can be enhanced while keeping the completeness from all the wavefield. In one application, a compensation factor (to be discussed later) is selected such that the tomography component's energy is substantially the same as the migration component's energy, where the term "substantially" means herein within a 20% margin. The shallow section where diving-wave-penetrated zone typically has better coverage of low-wavenumber components is not affected by this method.

Figure 4:
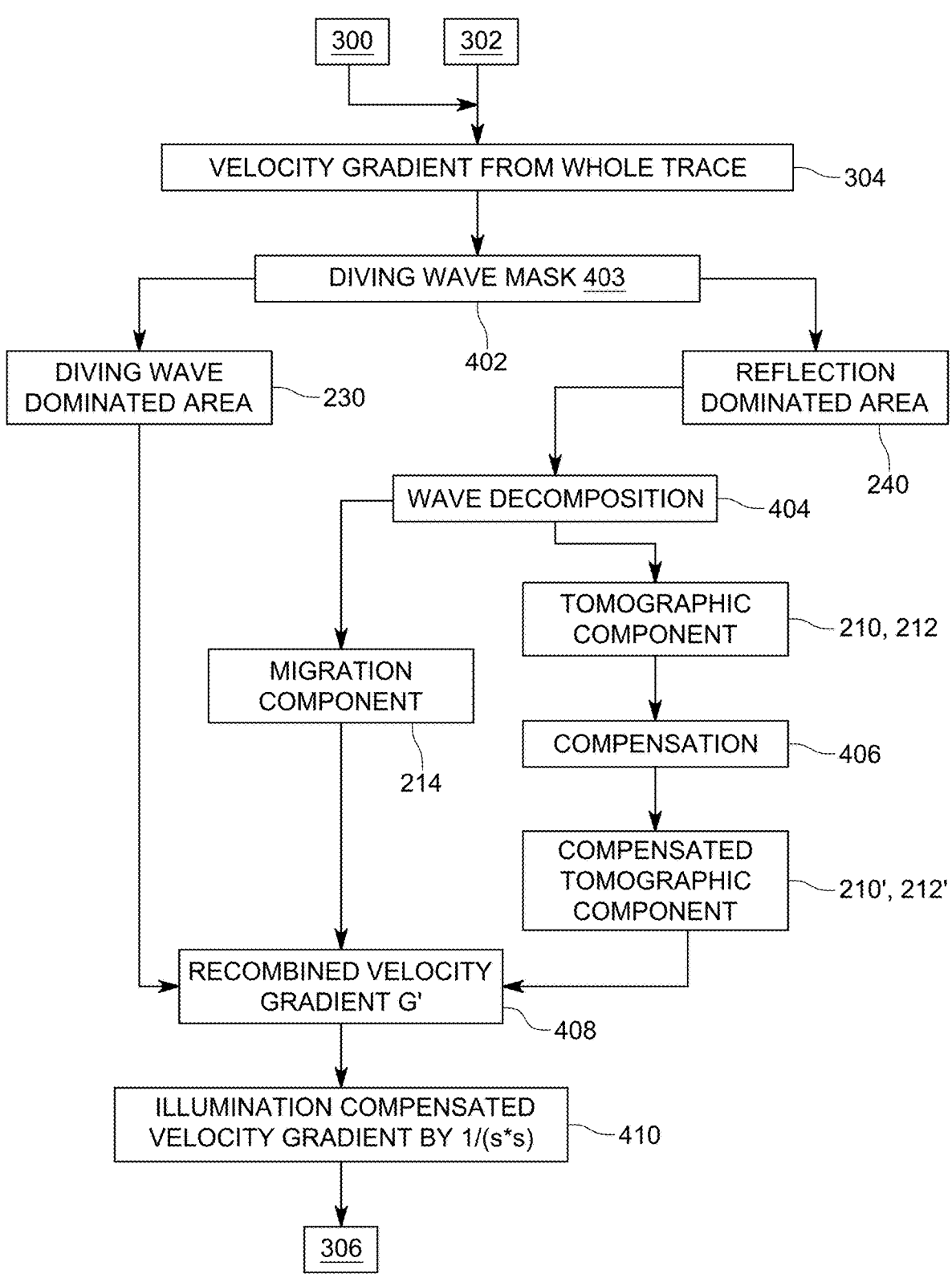
FIG. 4 illustrates the changes made to a step of the traditional full waveform inversion method for balancing low- and high-wavenumbers.

In more detail, the novel method, which is schematically illustrated in FIG. 4, includes steps 300 to 310 shown in FIG. 3, but step 304 is modified to include additional steps. In step 402, a diving wave mask 403 is calculated, where the diving mask 403 is a volume with a value from 0.0 to 1.0, where 1.0 indicates a diving wave dominated zone (e.g., zone 230 in FIG. 2), and 0.0 indicates a zone where the diving wave cannot penetrate (e.g., zone 240 in FIG. 2). The diving mask 403 shields the diving waves 120 from being processed or modified. The mask 403 can be estimated by diving wave penetration analysis (see, Virieux and Operto, 2009, noted above). In one application, the diving mask can be frequency dependent. The diving mask 403 separates the gradient shown in equation (1) as follows:

$$G_m = \int_{t=0}^{tmax} \left( (S * R)_{diving} + (S * R)_{mig} + \delta S * R + S * \delta R \right) dt, \qquad (2)$$

i.e., the diving and migration components (first two terms in equation (2)) are separated from the tomographic components (last two terms in the equation).

After applying the diving mask 403 in step 402 and separating the diving wave dominated area 230 from the reflection dominated area 240, a wave decomposition method 404 is applied only to the parts of the traces 220 that are part of the reflection dominated area 240. The wave decomposition step separates the different components by the direction of propagation of the source and residual wavefields (see, [1] or [3]), or by filtering according to the scattering-angle (see [7]). As a result of this step, the migration component 214, which is part of the term S(m) *R(m), is separated from the tomographic component 210, 212, which is part of the term δS(m)*R(m)+S(m)*δR(m). Note that the migration component 214 is well represented in terms of energy, and thus, there is no need to improve or boost this component. Only the tomographic component 210, 212, which corresponds to the low-wavenumbers or the scattered wavefields, is low in energy (by at least one order of magnitude when compared to the energy of the migration component or the transmitted component) and needs to be corrected. According to this method, the energy of this term is compensated in step 406 to generate the compensated tomographic component 210', 212'. The compensation step may use a scalar λ, which is spatially varying (in which case is a volume for a 3D case) or a constant scalar. The gradient velocity with the compensated tomographic component can be written as:

$$G_m = \int_{t=0}^{tmax} \left( (S*R)_{diving} + (S*R)_{mig} + \lambda(\delta S*R + S*\delta R) \right) dt. \quad (3)$$

There are several ways for implementing this compensation step. In one application, the scalar is given by $$\lambda = \sqrt{\frac{\|S\|_2}{\|\delta S\|_2}},$$

which is the ratio of the energy of a forward propagated wavefield $\|S\|_2$ and a scattered one $\|\delta S\|_2$. In another application, the scalar is given by $$\lambda = \frac{1}{r}$$

where r is the reflectivity, which is calculated from current models in each iteration (for example velocity v and density ρ models for the acoustic case) as $$r = \frac{1}{2} \frac{\nabla(\rho v)}{\rho v}.$$

For simplicity, in this implementation, only the component in the z direction is used, i.e., $$r = \frac{1}{2\rho v} \frac{\partial(\rho v)}{\partial z}.$$

In yet another implementation, the scalar is given by $$\lambda = \sqrt{\frac{\|(S*R)_r\|_2}{\|(\delta S*R + S*\delta R)\|_2}},$$

i.e., the root mean square (RMS) of the ratio of the migration component and the tomography component. For the above mentioned calculation, a regularization step can be added for stability considerations and/or a smoothing operator can be applied on A to have a gentle varied compensation. Other implementations are possible, for example, based on equation (11) or (13) in [3], or as a fixed scale based on a trial and error approach. The scalar λ may vary from iteration to iteration as both the S and R associated wavefields change from iteration to iteration and thus, the name dynamic resolution FWI.

After the compensated tomographic component 210', 212' has been calculated based on the scalar factor 1, a recombined velocity gradient G' is calculated by combining the diving component (unchanged by the iterations), the migration component 214 (unchanged by the iterations) and the compensated tomographic component 210' and 212'. Note that according to this scheme, the original velocity gradient G has been separated into three components, according to the location and opening angle, and the gradient in the diving wave penetration zone has been maintained intact as there are more reliable low to intermediate wavenumber components for this zone. Thus, in step 408, an illumination compensated velocity gradient G' (note that the global compensation/precondition may be optional for different purposes) is provided and the compensation may be expressed as being 1/s*s, where s stands for the source side full wavefield.

The method then advances to step 306 (see FIG. 3) and continues as described in the method illustrated in FIG. 3. Note that the steps shown in FIG. 4 replace only the step 304 in FIG. 3 and all the other steps in FIG. 3 may remain unchanged. It is noted that in this new method illustrated in FIG. 4, only the reflection-driven zone 240 has enhanced the tomography component during the inversion. Through the iterative process discussed above, the tomography component has been accumulated from a low frequency to a higher one and the resolution has been improved accordingly. A time-lag cost function (see [11], which introduces the time-lag FWI, TLFWI) may be used in the method of FIG. 4 to downplay the amplitude discrepancy between the real data and the modelled one.

The depth of a reflector (described here by the migration component in the velocity) is updated in the DR-FWI from the low frequency to a high one since the tomography component is included in the velocity as well. However, the imprint of the inaccurate initial velocity will be present in the current results. Due to the wave decomposition technique discussed in steps 403 and 404, the migration component, which is contaminated with the error of the background velocity from the initial model, can be taken out from the velocity after the method has obtained the updated low-wavenumber velocity. The new migration component can be obtained in new cycle of FWI from the updated background velocity where the depth of the reflector will have an improved accuracy.

Thus, in one embodiment, the proposed Dynamic Resolution FWI (DR-FWI) builds contrast into the velocity model by enabling the simulation of reflections and corresponding multiples as well, hence it can work directly with the raw seismic data. The velocity gradient G from the raw seismic data can be separated into three components (see FIG. 4): the banana component 216 in the shallow zone 230 where diving waves penetrate and are defined by a pre-estimated mask 403, the tomographic component (low-wavenumber component) 210, 212 and the migration component (high-wavenumber component) 214, which are both beyond the reach of the diving waves, where these two components are separated by wave decomposition or scattering angle filtering. The tomographic component 210, 212 is weaker than the migration component 214 due to the additional reflections that happened during the propagation of the waves from the source to the receivers. This additional reflection can be compensated by the corresponding illumination, which can be designed in each iteration, hence the process of dynamic weighting can be applied to the different components in the FWI kernel, so as to optimize the contribution of the low- and high-wavenumbers in the velocity model. There is only one parameter m to be inverted and one iteration update 312 includes both low- and high-wavenumber components. Additional memory is required to store the tomographic only velocity in the deep section as a by-product, which can be used for the next cycle of the DR-FWI method to rebuild the migration component with a more accurate depth position.

Figure 5A:
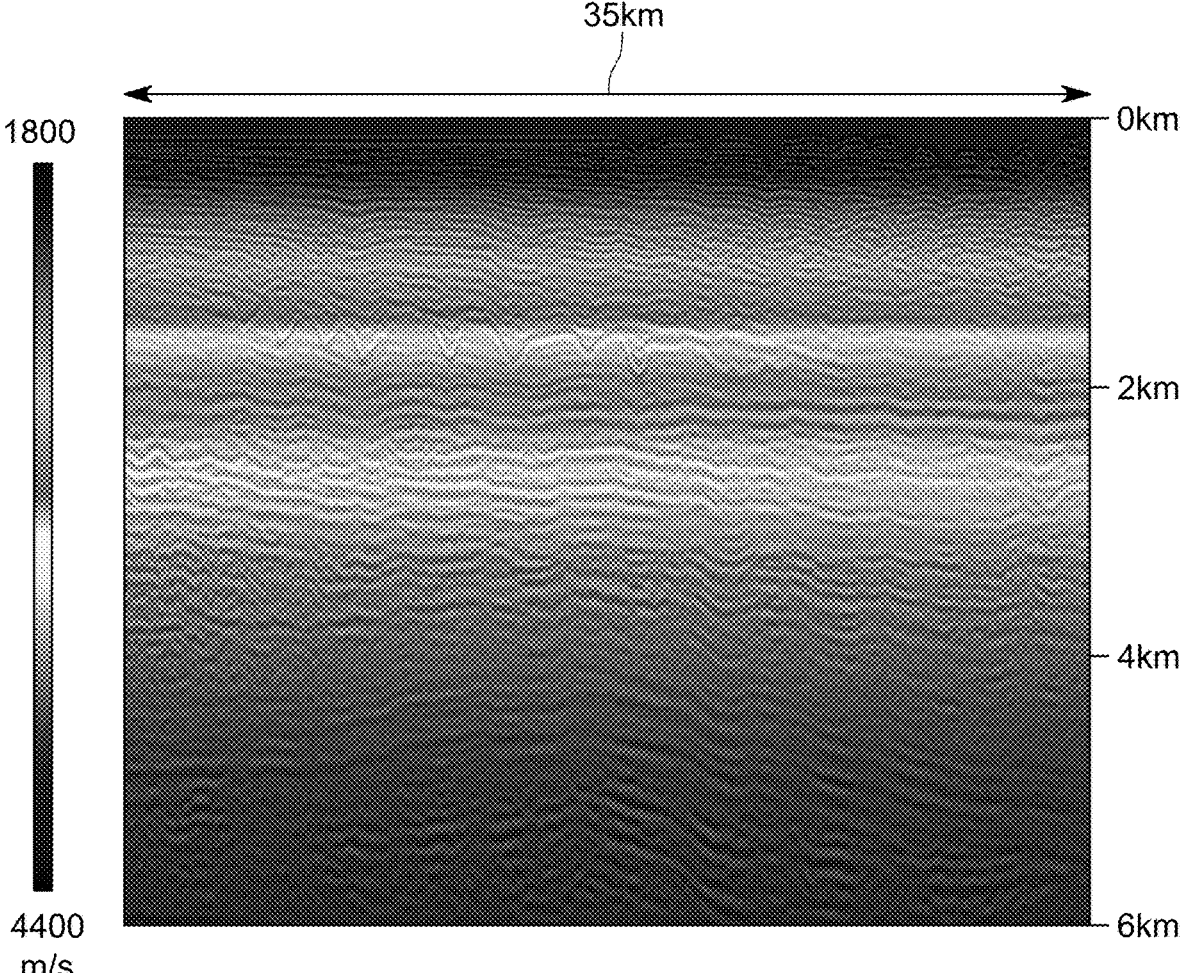
FIGS. 5A and 5B illustrate the velocity model and the common image gathers (CIGs) of a given subsurface before applying any inversion processing algorithm.
Figure 5B:
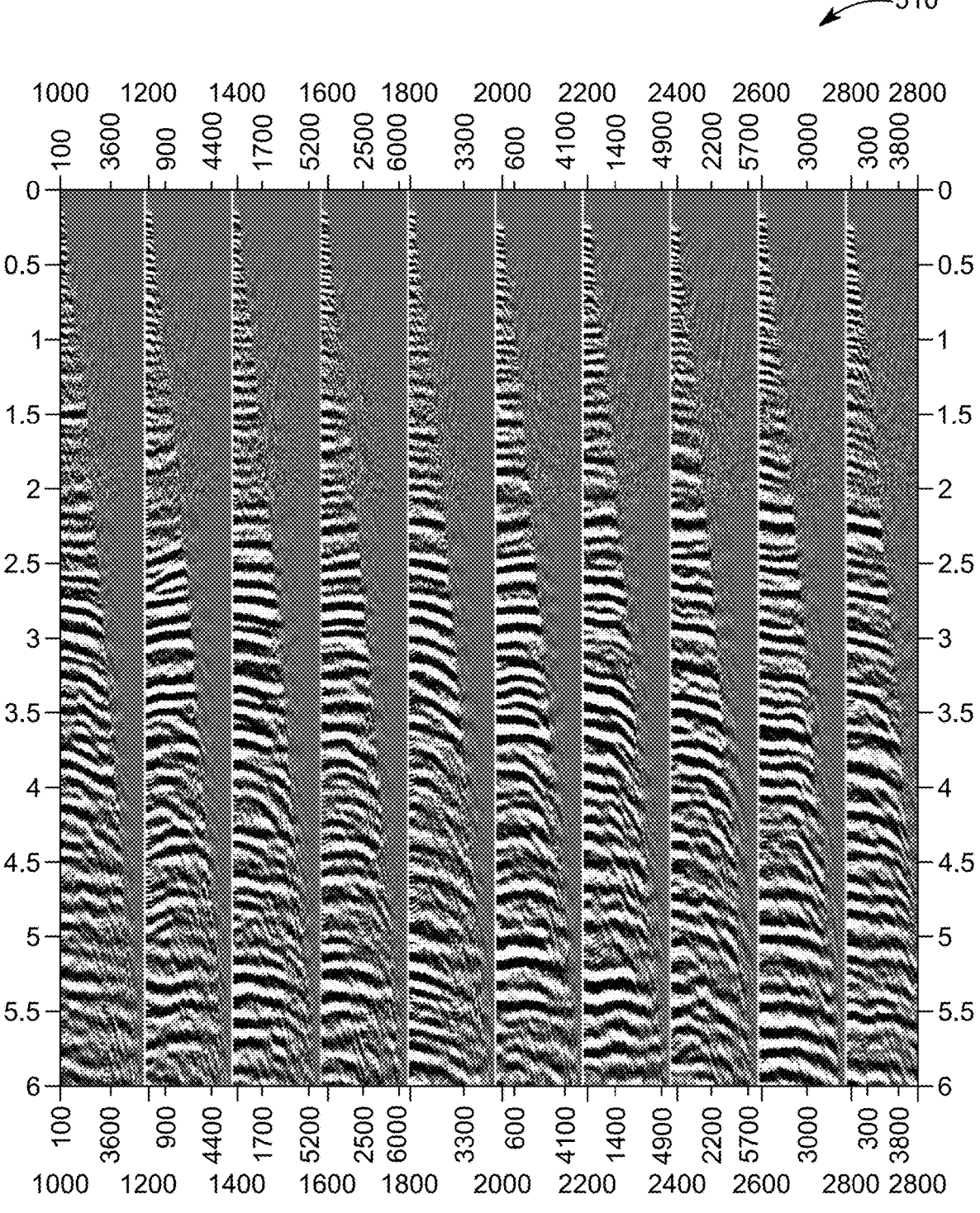
Figure 6A:
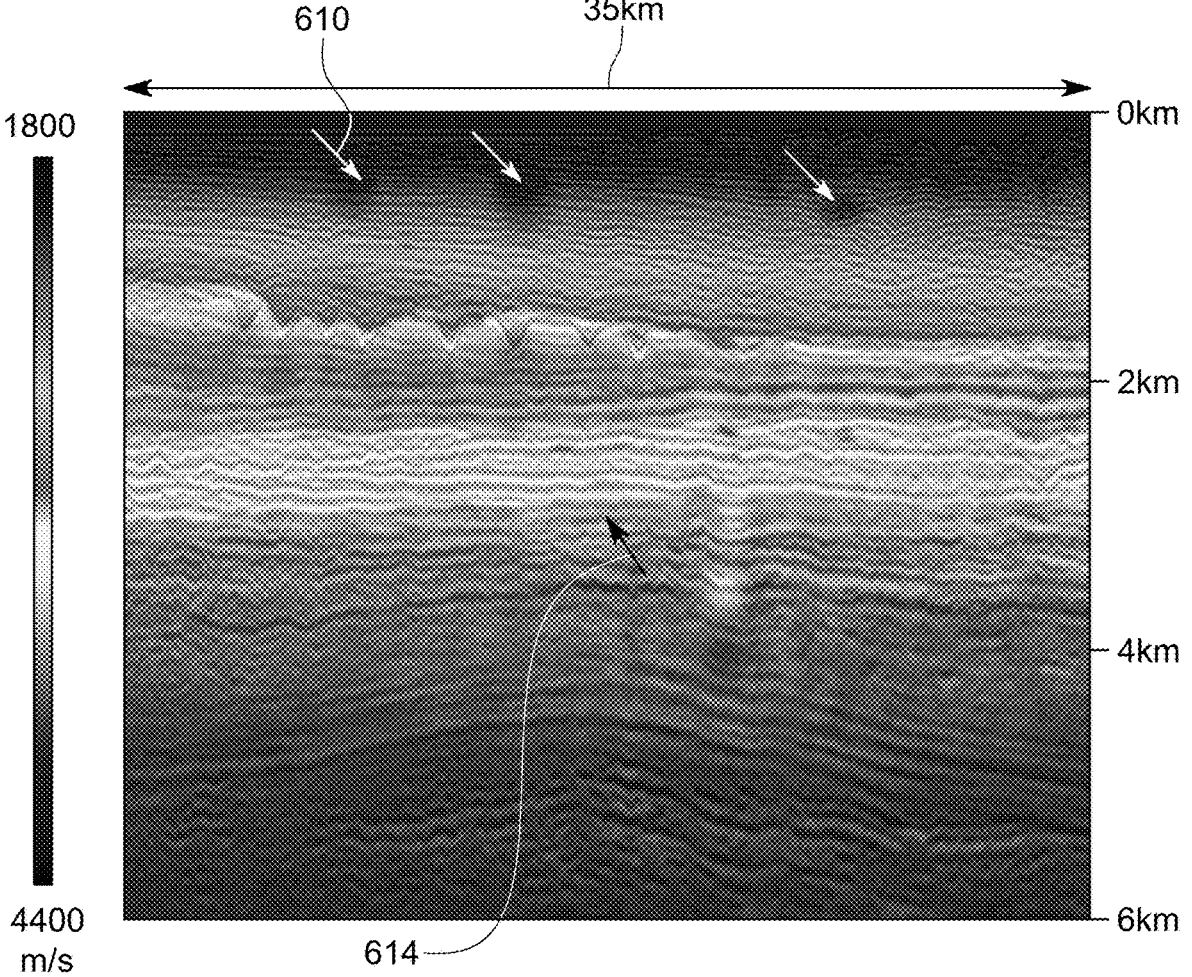
FIGS. 6A and 6B illustrate the velocity model and the CIGs after applying the traditional full waveform inversion method.
Figure 6B:
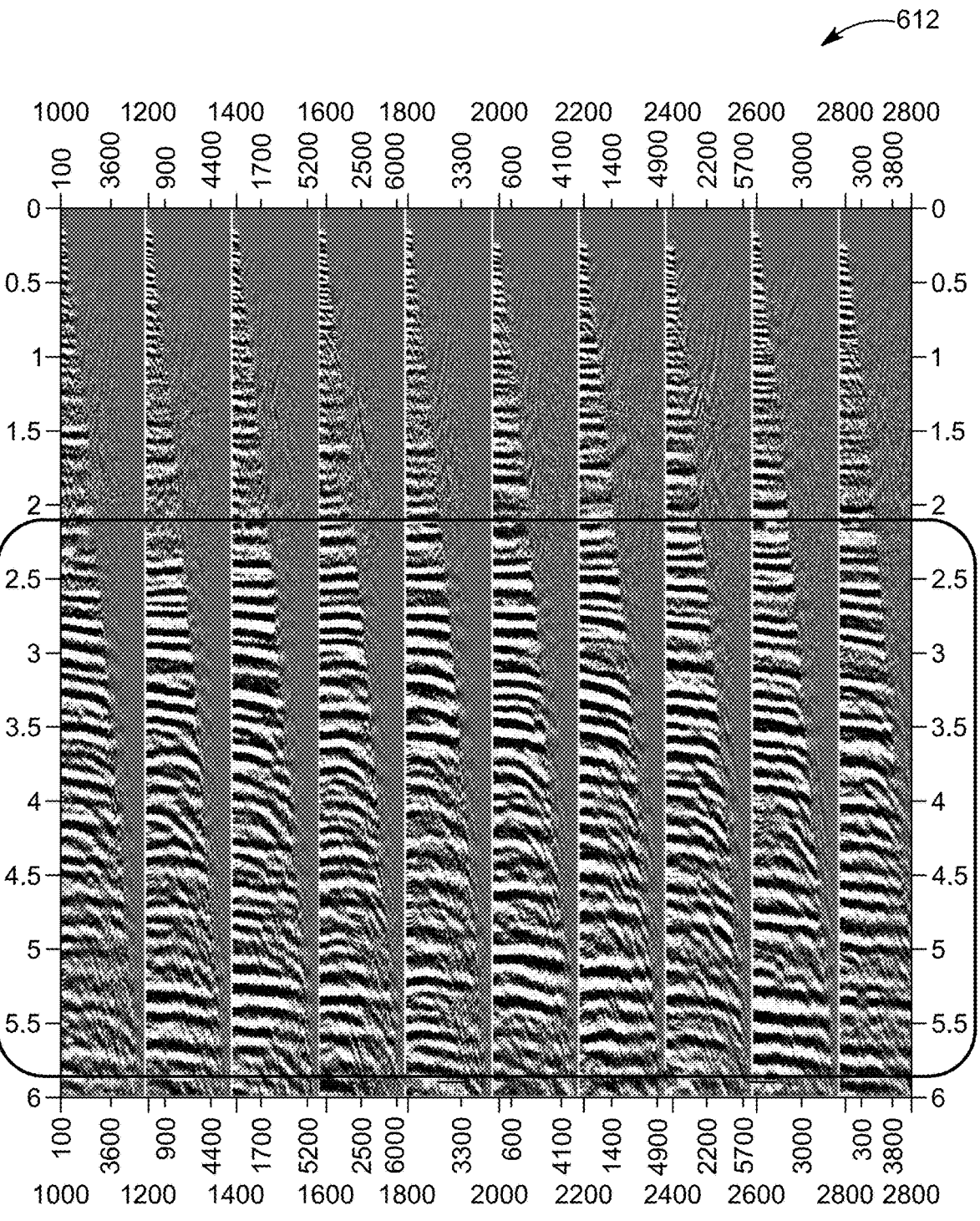

The proposed DR-FWI method has been applied on both synthetic and real data and show good velocity update beyond the reach of the diving wave and improved image at the deep section. In the following, only the application to the synthetic data is discussed. The synthetics are generated from elastic modeling and some noise is added in the low frequency to simulate the real situation. The inversion is based on the acoustic wave equation and only the initial pressure velocity is provided. FIG. 5A shows the starting velocity overlaid on a pre-stack depth migration (PSDM) stack and FIG. 5B shows the corresponding common image gathers (CIGs) 510. Note that FIG. 5B shows the number of traces on the x axis and the travel depth on the y axis. The velocity has a simple 1D variation, i.e., varies only with the depth; the distortion on the PSDM stack and visible moveout on the CIGs 510 indicate the velocity is far from true. Using the raw seismic data including diving waves and reflection, the inventors run them through TLFWI from 3 Hz to 12 Hz, and the corresponding results are shown in FIGS. 6A and 6B. When comparing these results to the initial ones in FIG. 5A and 5B, one can observe the shallow velocity 610 is well resolved by the diving wave in the TLFWI method. The slow velocity anomalies and shallow channels are captured as indicated by arrows 610, and the CIGs 612 are quite flat at shallow depth. However, it can be noticed the presence of a residual curvature below 2 km, which is corresponding to a slow velocity layer 614 just beneath the diving wave penetration. In principle, the TLFWI method is able to correct some low-wavenumber velocity errors beyond the reach of the diving wave as it was discussed early that there is a tomographic component from reflections. However, the magnitude of this term is small, so the corresponding correction is minimum. Thus, one can expect large velocity errors at this depth.

Figure 7A:
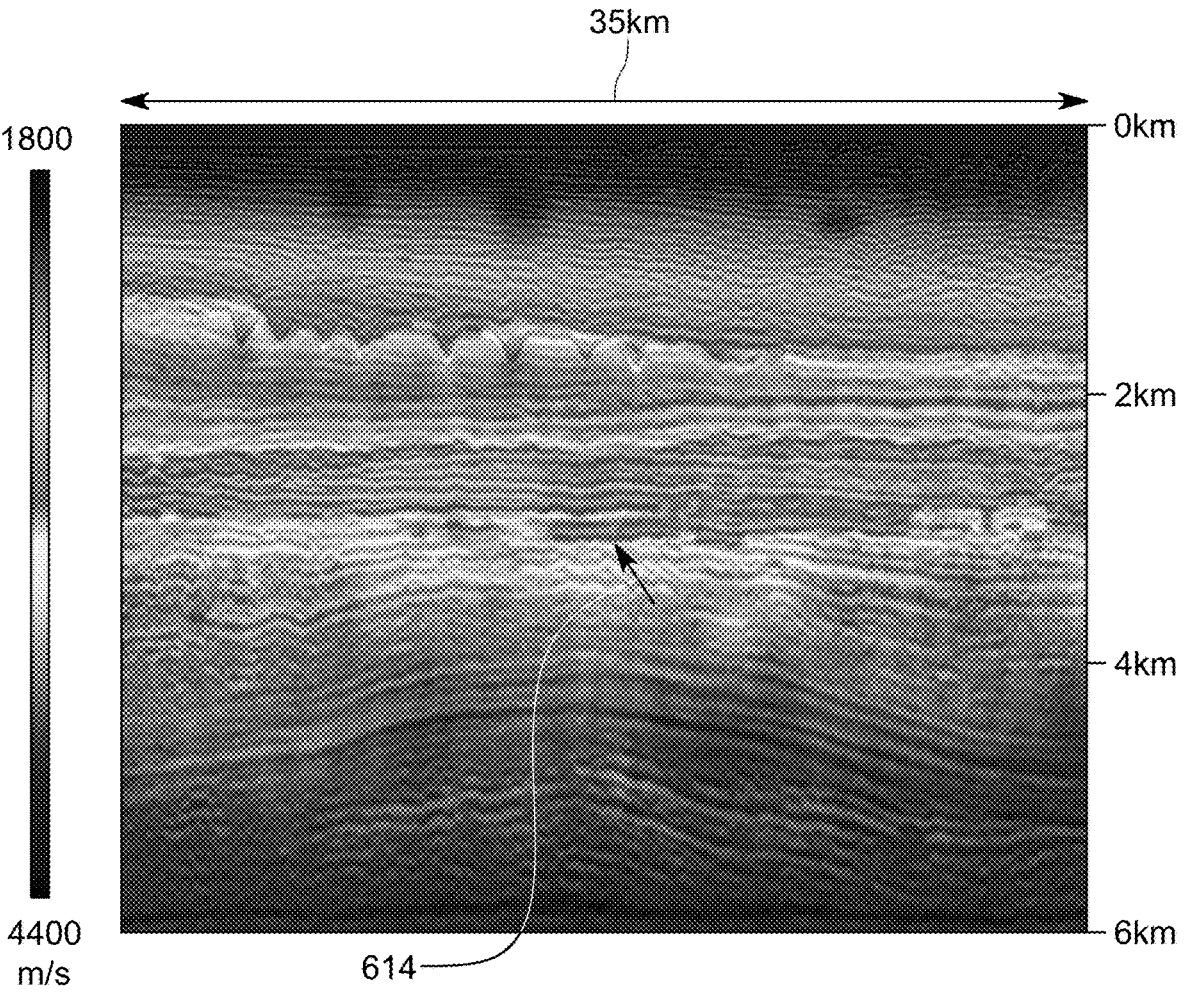
FIGS. 7A and 7B illustrate the velocity model and the CIGs after applying a novel full waveform inversion method.
Figure 7B:
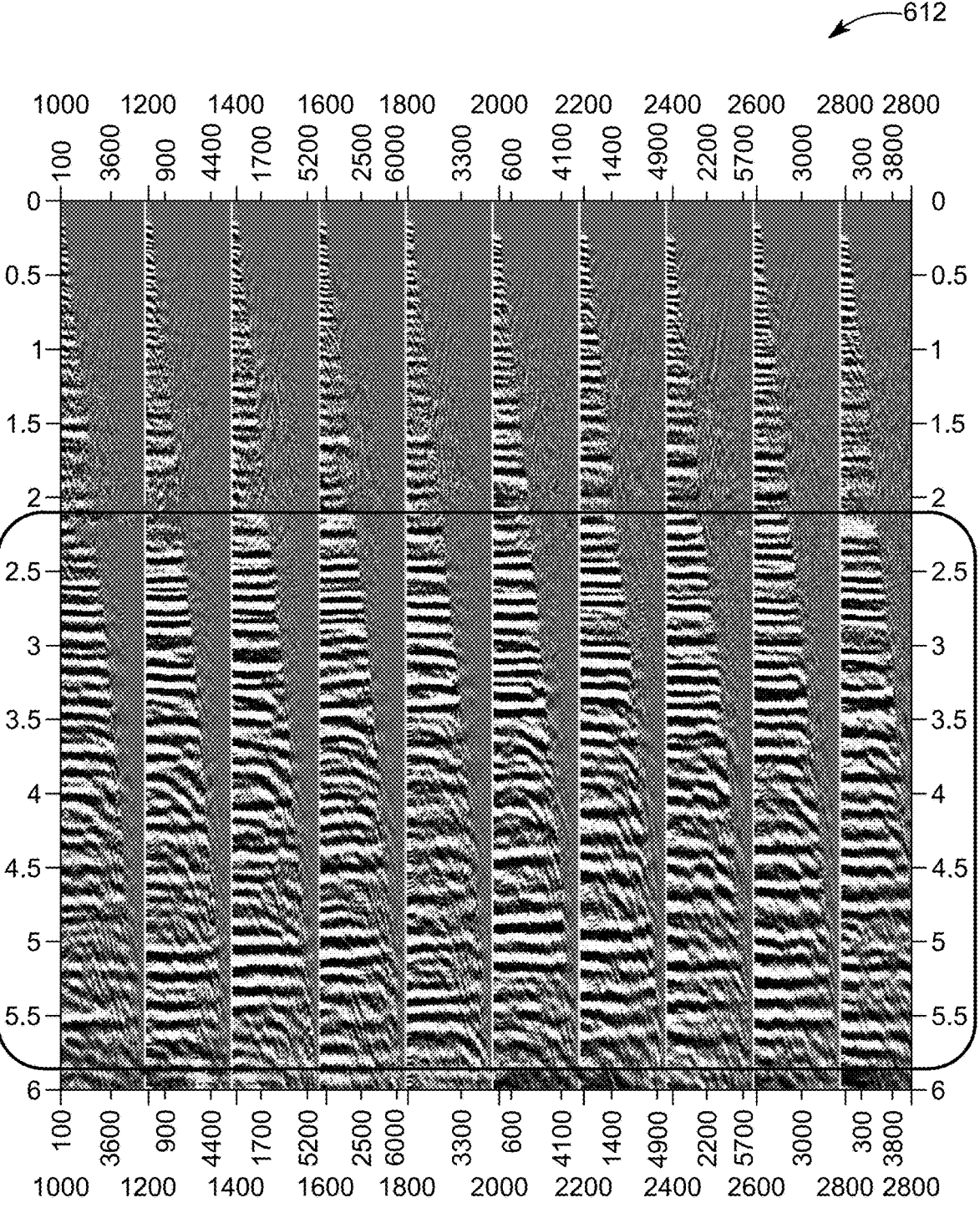

Different from these two cases illustrated in FIGS. 5A to 6B, the novel DR-FWI method (which uses a time-lag cost function in this case) produces improved results, as shown in FIGS. 7A and 7B, as the low-wavenumber component from the reflections has been compensated and able to correct the velocity error in the deep section, by using the reflection energy. More specifically, FIG. 7A shows the slow velocity layer 614 has been well resolved and the depth of the reflector is corrected as well. The reflectors become focused, and the gathers 612 are mostly flat. One may expect some residual uncertainty especially at the very deep part where the angle coverage became narrower in the same offset range.

Thus, the new DR-FWI method essentially provides a new compensation scheme to account for the impact of reflectivity on the velocity gradients. In one application, only one parameter needs to be inverted by the novel method as the method accumulates the velocity perturbation related to the full gradient and the gradient without the migration component separately, with a step-length determined by the former full perturbation related velocity model. In this application or another application, the velocity updated by gradient without the migration components can be used for the next FWI cycle update to rebuild the migration component with more accurate depth position. In this context, one cycle of FWI means FWI from low frequency to a certain frequency band, for example, 12 Hz.

Figure 8:
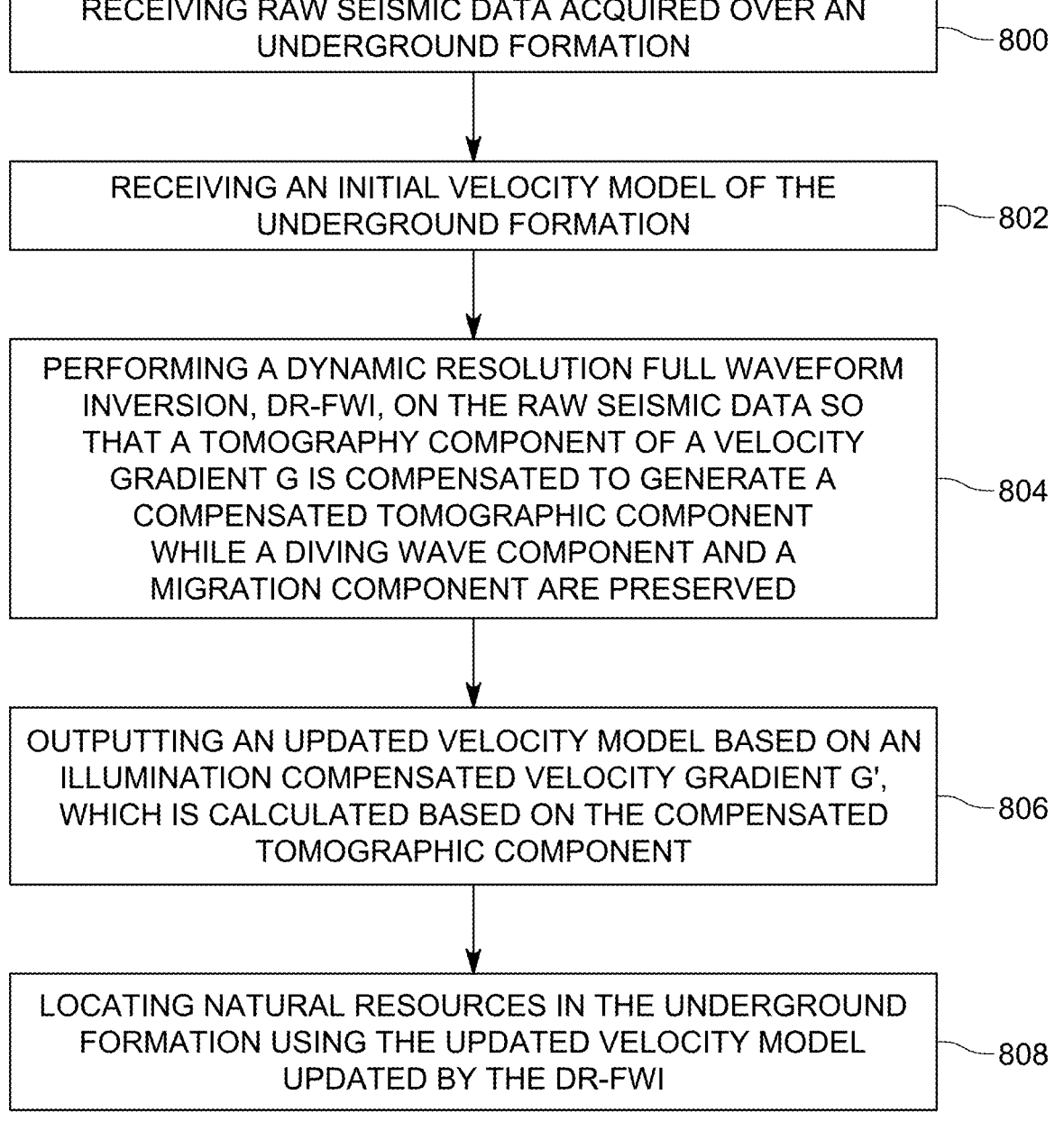
FIG. 8 is a flow chart of a method for applying dynamic resolution full waveform inversion.

A method for raw seismic data inversion based on the concepts introduced in FIG. 4 is now discussed with regard to FIG. 8. The method includes a step 800 of receiving raw seismic data 220 acquired over an underground formation 121, a step 802 of receiving an initial velocity model 303 of the underground formation 121, a step 804 of performing a dynamic resolution full waveform inversion, DR-FWI, on the raw seismic data 220 so that a tomography component 210, 212 of a velocity gradient G is compensated to generate a compensated tomographic component 210', 212' while a diving wave component 216 and a migration component 214 are preserved, a step 806 of outputting an updated velocity model 311 based on an illumination compensated velocity gradient G', which is calculated based on the compensated tomographic component 210', 212', and a step 814 of locating natural resources 114 in the underground formation 121 using the updated velocity model 311 updated by the DR-FWI. The step of performing may include calculating the velocity gradient G from full traces 220 of the seismic data, and separating the velocity gradient G into (1) a diving component and (2) the migration component and the tomography component by applying a diving wave mask.

The method may further include separating the tomography component from the migration component, and compensating only the tomography component to obtain the compensated tomographic component. The step of compensating may further includes multiplying the tomography component with a varying scalar to obtain the compensated tomographic component. In one application, the varying scalar is equal to a square root of a ratio between (1) an energy forward propagated wavefield, and (2) an energy of a scattered wavefield. In another application, the varying scalar is equal to an inverse of a reflectivity calculated from a current model at each iteration. In yet another application, the varying scalar is equal to a root mean square of the migration component and the tomography component.

The method may further include combining the compensated tomographic component with the unchanged migration component and the diving component to obtain the illumination compensated velocity gradient G', and/or estimating a step length prediction for the DR-FWI, and/or determining whether a cost function reached a predefined threshold, and/or returning to the step of performing if the cost function did not reach the predefined threshold.

Figure 9:
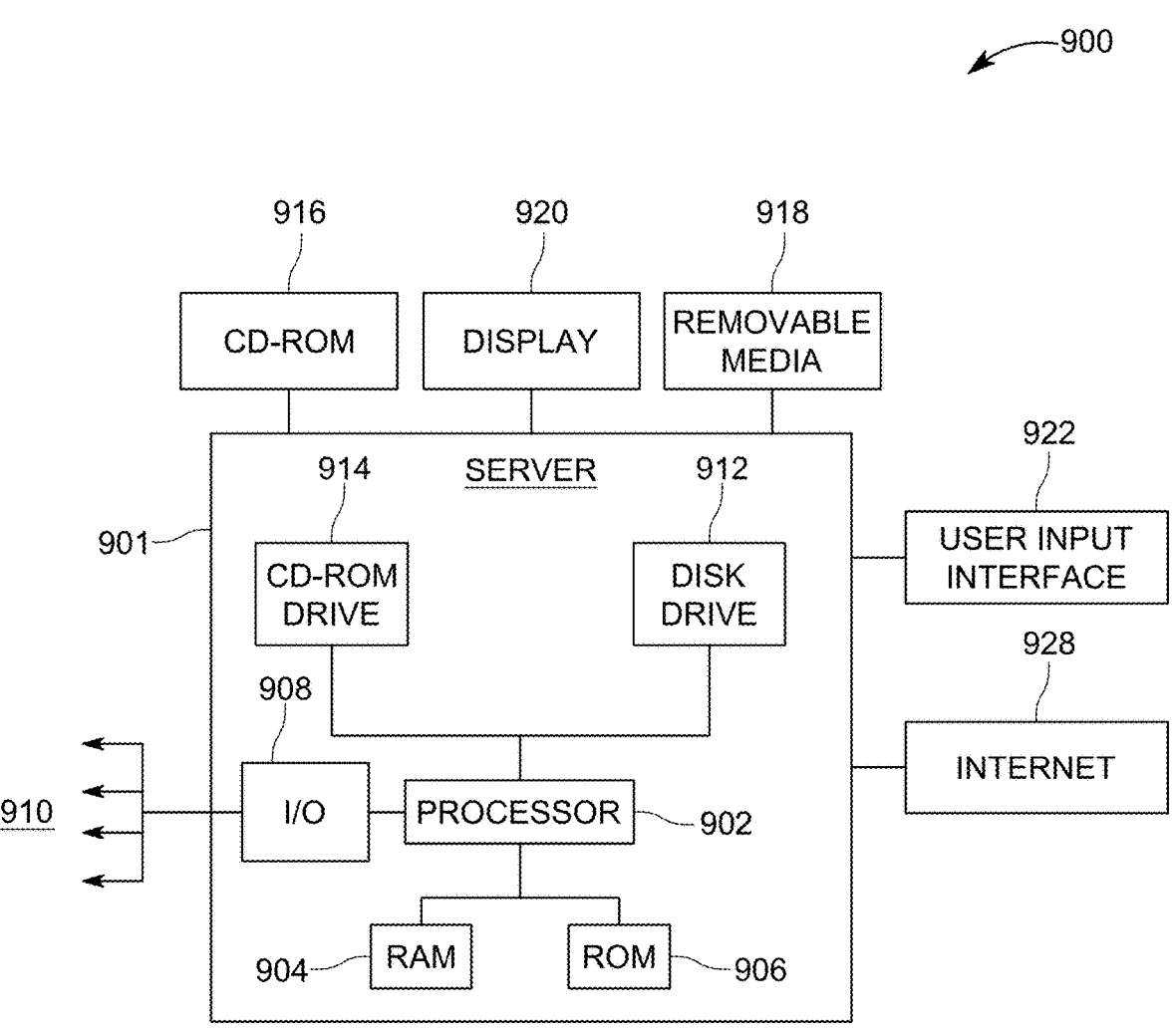
FIG. 9 is a block diagram of a seismic data processing apparatus, according to an embodiment.

The above-discussed methods may be implemented in a computing device 900 as illustrated in FIG. 9. Hardware, firmware, software or a combination thereof may be used to perform the various steps and operations of the above-described methods/techniques.

Computing device 900 suitable for performing the activities described in the exemplary embodiments may include a server 901. Server 901 may include a central processor (CPU or GPU) 902 coupled to a random-access memory (RAM) 904 and to a read-only memory (ROM) 906. ROM 906 may also be other types of storage media to store programs, such as programmable ROM (PROM), erasable PROM (EPROM), etc.

Processor 902 may communicate with other internal and external components through input/output (I/O) circuitry 908 and bussing 910 to provide control signals and the like. Processor 902 carries out a variety of functions as are known in the art, as dictated by software and/or firmware instructions. The processor is configured to perform a full-waveform inversion, FWI, of the raw seismic data using a wave separation process to separate the low- and high-wavenumber components, and to compensate the additional reflection by a corresponding illumination volume, which can be changed at each iteration to achieve a dynamic weighting. RAM 904 may be configured to store executable codes that when executed by a computer make the computer perform a seismic exploration method such as the method illustrated in FIG. 8 and its variations described in this section.

Server 901 may also include one or more data storage devices, including hard drives 912, CD-ROM drives 916 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network such as the Internet 928, which allows ultimate connection to various computing devices.

The embodiments described in this section set forth seismic data processing using dynamic resolution FWI. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

REFERENCES

[1] P. Mora, 1989, Inversion=migration+tomograpy, *Geophysics*, vol. 54, no. 12, p 1575-1586.
[2] Xu, S., Wang, D., Chen, F., Lambare, G. and Zhang, Y. [2012]. Inversion on reflected seismic wave. 82nd SEG Annual International Meeting, Expanded Abstracts, 1-7.
[3] Tang, Y., Lee, S., Baumstein, A., and Hinkley, D. Tomographically enhanced full wavefield inversion. 83$^{rd}$ SEG International Exposition and Annual Meeting, Expanded Abstracts, 1037-1041.
[4] Irabor, K., and M. Warner, [2016]. Reflection FWI. 87$^{th}$ SEG international Exposition and Annual Meeting, Expanded Abstracts, 1136-1140.
[5] Gomes, A., and Chazalnoel, N. Extending the reach of FWI with reflection data: Potential and challenges. 87$^{th}$ SEG International Exposition and Annual Meeting, Expanded Abstracts, 1454-1459.
[6] Wang, P., Z. Zhang, Z. Wei, and R. Huang, 2018, A demigration-based reflection full-waveform inversion workflow: 88$^{th}$ SEG Internaltion Exposition and Annual Meeting, SEG, Expanded Abstracts, 1138-1142.
[7] Alkhalifah, T., 2015, Scattering-angle based filtering of the waveform inversion gradients: *Geophysical Journal International*, 200, 363-373.
[8] Deng, P., Y. E. Lee, M. Wang, J. Li, B. Hung, K. J. Lee, M. Kim, S. Kim, C. Jeong, M. Li and J. He, 2022, Correction fault shadows—a case study comparison of fault-constrained tomography and time-lag full-waveform inversion: 88$^{th}$ EAGE International Exploration and Annual Meeting, Expanded Abstracts.
[9] Gomes, A. and Yang, Z., 2018, Improving reflection FWI reflectivity using LSRTM in the curvelet domain. 88th SEG Annual International Meeting, Expanded Abstracts, 1248-1252.
Zhang, Z., Z. Wu, Z. Wei, J. Mei, R. Huang, and P. Wang, 2020, FWI Imaging: Full-wavefield imaging through full-waveform inversion: 90$^{th}$ Annual International Meeting, SEG, Expanded Abstracts, 656-660.
Zhang, Z., J. Mei, F. Lin, R. Huang, and P. Wang, 2018, Correcting for salt misinterpretation with full-waveform inversion: 88$^{th}$ Annual International Meeting, SEG, Expanded Abstracts, 1143-1147.

What is claimed is:
1. A method for raw seismic data inversion, the method comprising:
receiving raw seismic data acquired over an underground formation;
receiving an initial velocity model of the underground formation;
performing a dynamic resolution full waveform inversion, DR-FWI, on the raw seismic data so that a tomography component of a velocity gradient G is compensated to generate a compensated tomographic component while a diving wave component and a migration component are preserved;
outputting an updated velocity model based on an illumination compensated velocity gradient G', which is calculated based on the compensated tomographic component; and locating natural resources in the underground formation using the updated velocity model updated by the DR-FWI.

2. The method of claim 1, wherein the step of performing comprises:

calculating the velocity gradient G from full traces of the seismic data; and separating the velocity gradient G into (1) a diving wave component and (2) the migration component and the tomography component by applying a diving wave mask.

3. The method of claim 2, further comprising:

separating the tomography component from the migration component; and compensating only the tomography component to obtain the compensated tomographic component.

4. The method of claim 3, wherein the step of compensating comprises:

multiplying the tomography component with a varying scalar to obtain the compensated tomographic component.

5. The method of claim 4, wherein the varying scalar is equal to a square root of a ratio between (1) an energy of a forward propagated wavefield, and (2) an energy of a scattered wavefield.

6. The method of claim 4, wherein the varying scalar is equal to an inverse of a reflectivity calculated from a current model at each iteration.

7. The method of claim 4, wherein the varying scalar is equal to a root mean square of a ratio of the migration component and the tomography component.

8. The method of claim 4, further comprising:

combining the compensated tomographic component with the unchanged migration component and the diving component to obtain the illumination compensated velocity gradient G'.

9. The method of claim 8, further comprising:

estimating a step length or Hessian matrix for the DR-FWI based on the illumination compensated velocity gradient G';

determining whether a cost function reached a predefined threshold; and returning to the step of performing if the cost function did not reach the predefined threshold.

10. A computing device for raw seismic data inversion, the device comprising:

an interface for receiving raw seismic data acquired over an underground formation, and for receiving an initial velocity model of the underground formation; and a processor connected to the interface and configured to:

perform a dynamic resolution full waveform inversion, DR-FWI, on the raw seismic data so that a tomography component of a velocity gradient G is compensated to generate a compensated tomographic component while a diving wave component and a migration component are preserved;

output an updated velocity model based on an illumination compensated velocity gradient G', which is calculated based on the compensated tomographic component; and locate natural resources in the underground formation using the updated velocity model updated by the DR-FWI.

11. The device of claim 10, wherein the processor is further configured to:

calculate the velocity gradient G from full traces of the seismic data; and separate the velocity gradient G into (1) a diving wave component and (2) the migration component and the tomography component by applying a diving wave mask.

12. The device of claim 11, wherein the processor is further configured to:

separate the tomography component from the migration component; and compensate only the tomography component to obtain the compensated tomographic component.

13. The device of claim 12, wherein the processor is further configured to:

multiply the tomography component with a varying scalar to obtain the compensated tomographic component.

14. The device of claim 13, wherein the varying scalar is equal to a square root of a ratio between (1) an energy forward propagated wavefield, and (2) an energy of a scattered wavefield.

15. The device of claim 13, wherein the varying scalar is equal to an inverse of a reflectivity calculated from a current model at each iteration.

16. The device of claim 13, wherein the varying scalar is equal to a root mean square of a ratio of the migration component and the tomography component.

17. The device of claim 13, wherein the processor is further configured to:

combine the compensated tomographic component with the unchanged migration component and the diving component to obtain the illumination compensated velocity gradient G'.

18. The device of claim 17, the processor is further configured to:

estimate a step length or Hessian matrix for the DR-FWI based on the illumination compensated velocity gradient G';

determine whether a cost function reached a predefined threshold; and return to the step of performing if the cost function did not reach the predefined threshold.

19. A non-transitory computer readable recording medium storing executable codes that when executed by a computer make the computer perform a method for raw seismic data inversion, the method comprising:

receiving raw seismic data acquired over an underground formation;

receiving an initial velocity model of the underground formation;

performing a dynamic resolution full waveform inversion, DR-FWI, on the raw seismic data so that a tomography component of a velocity gradient G is compensated to generate a compensated tomographic component while a diving wave component and a migration component are preserved;

outputting an updated velocity model based on an illumination compensated velocity gradient G', which is calculated based on the compensated tomographic component; and locating natural resources in the underground formation using the updated velocity model updated by the DR-FWI.

20. The medium of claim 19, wherein the step of performing comprises:

calculating the velocity gradient G from full traces of the seismic data;

separating the velocity gradient G into (1) a diving wave component and (2) the migration component and the tomography component by applying a diving wave mask, separating the tomography component from the migration component; and compensating only the tomography component to obtain the compensated tomographic component.

\* \* \* \* \*